UNITED STATES PATENT OFFICE.

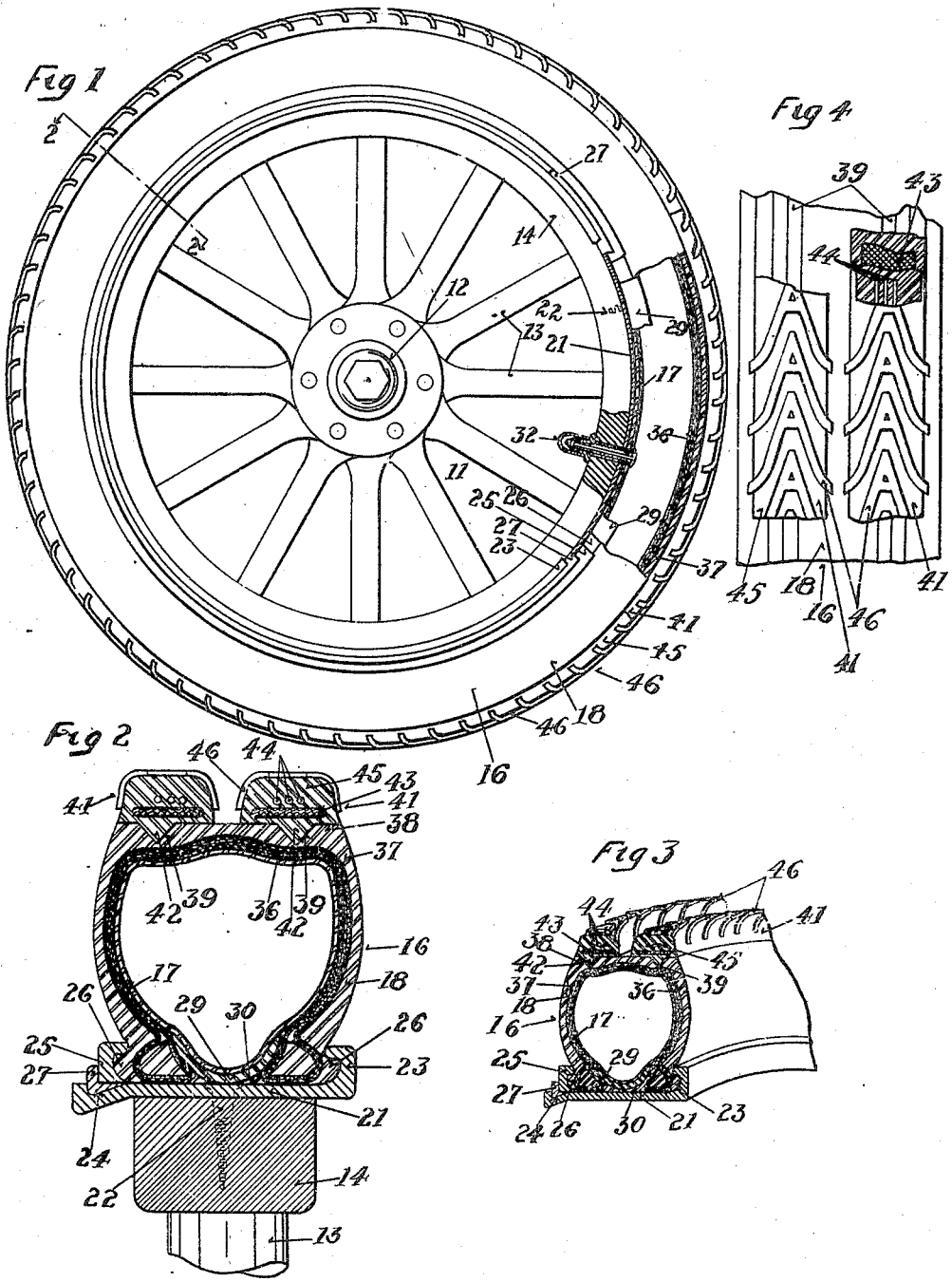

AUGUST G. MASS, OF CINCINNATI, OHIO, ASSIGNOR OF ONE-HALF TO JOSEPH W. STAPLETON, OF CINCINNATI, OHIO.

DETACHABLE TREAD FOR PNEUMATIC TIRES.

1,234,193.  Specification of Letters Patent.  Patented July 24, 1917.

Application filed August 12, 1915. Serial No. 45,111.

*To all whom it may concern:*

Be it known that I, AUGUST G. MASS, a citizen of the United States, residing in Cincinnati, in the county of Hamilton and State of Ohio, have invented certain new and useful Improvements in Detachable Treads for Pneumatic Tires, of which the following is a specification.

My invention relates to detachable treads for pneumatic tires, and has for its object the provision of novel means for protecting the pneumatic tube and the casing thereabout. It is the further object of my invention to provide an annular tread for the casing of an inflatable tire so arranged that the same may be replaced when worn, arranged to be held in place by the inflation of the inflatable tire-member and to be removed upon deflation of said tire-member.

The invention will be further readily understood from the following description and claims, and from the drawing, of which latter:

Figure 1 represents a side elevation of a wheel provided with my improved device, partly broken away for better illustration of parts.

Fig. 2 is a cross-section of the same on the line 2—2 of Fig. 1.

Fig. 3 is a perspective view of the tire portion of the vehicle wheel, partly broken away, one end of the part shown being represented in cross-section on the line 2—2 of Fig. 1; and Fig. 4 is an edge view of the vehicle wheel, partly broken away for better illustration of parts.

The body of the vehicle wheel is shown at 11, and in the present exemplification comprises a hub 12, spokes 13, and a felly 14, all of usual construction.

16 represents an inflatable tire, comprising an inner inflatable tube 17 and an outer casing 18. The casing is shown placed on the wheel-body by quick detachable means, comprising a rim 21, which is an annular plate surrounding the felly and held in place in suitable manner, as by means of screws 22.

The rim comprises an annular clencher flange 23 at one side thereof. At the other side thereof there is an annular groove 24. An annular detachable clencher flange 25, which is a closed ring, is received about the rim at the annular groove 24. The clencher flanges 23 and 25 coact with the annular beads 26 at the respective sides of the outer casing 18. 27 is a split-ring which is received in the annular groove 24 for locking the integral detachable clencher flange 25 against displacement outwardly, so that, when the tire is inflated, the beads of the tire-casing will be received under the clencher flanges, and exert outward pressure upon the same for locking the tire in place.

An annular apron 29 is arranged to be received in the annular space 30 between the beads of the outer casing for protecting the inner tube.

An inflating valve 32 of usual construction is received through suitable holes in the felly 14, the rim 21 and the annular apron 29, and communicates with and is secured to the inner tube for inflating and deflating the latter.

The outer casing is preferably formed up with an inner carcass 36, comprising a series of layers of fabric and rubber, and an outer rubber wall 37, the carcass and the outer wall being integral with each other. The annular periphery of the casing is preferably formed substantially cylindrical, as shown at 38, and provided with annular grooves 39, two of these grooves being shown, substantially triangular in cross-section.

Annular integral shoes are received about the outer annular periphery of the casing, held in place by the inflation of the tire, and provided with parts coacting with the annular grooves. Two of these outer annular shoes are shown, one at each side of the tire. Each of the annular shoes preferably comprises a flexible annular body 41, having an inwardly extending annular rib 42, this rib in the present instance being a closed annular rib.

A closed annulus 43, of webbing, is located in the inner portion of the body 41, and surrounds the annular rib 42. It is wider than the rib. Surrounding the closed annulus 43 of webbing or fabric, one or more closed annuli 44 of wire are received, three of these closed wire rings being shown as surrounding the fabric ring 43 and the annular rib 42. An annular outer portion 45 of the annular body 41, surrounds the wire rings 44, and forms the wearing body of the tire, and may, if desired, be provided with an anti-skidding surface 46, shown in the form of repetitions of the letter A, formed by projections projecting outwardly from the outer annular periphery and sides of the body 41. These projections, extending inwardly along the sides of the annular shoes, increase the anti-skidding property of the tire.

The annular shoes are held in place by the coaction between the annular ribs 42 and the annular grooves 39, when the tire is inflated. These annular shoes provide the wearing surface for the tire, and raise the inflatable portion of the tire from the ground, and thereby remove the inflatable portion from contact with the ground and any objects thereon tending to puncture the tire. If it is desired to remove the annular wearing shoe, the tire is deflated by the opening of the valve 32. The deflation of the tire permits a collapsing of the casing of the tire to sufficient extent to allow the annular rib 42 to be slipped out of the annular groove 39, thereby removing the annular shoe from the tire.

In replacing the annular shoe, the annular shoe is slipped over the inflatable tire while the latter is in deflated condition, the annular rib 42, being placed opposite the annular groove 39. Upon inflation of the tire the diameter of the casing will be increased, thereby causing lodgment of the annular rib 42 in the annular groove 39, and fixing the annular wearing shoe upon the tire.

The casing and inner tube, when the latter is employed, are so formed that the inflatable portion thereof is located under the shoe, that is, between the annular shoe and the rim of the wheel. The inflated cavity of the pneumatic tube projects laterally substantially throughout the width of the annular shoe at each side of the wheel between planes perpendicular to the axis of rotation of the wheel in which the lateral boundaries of said respective annular shoes are located, thereby giving full effective cushioning to each of the annular shoes.

The annular shoes are readily yieldable to accommodate various load and travel conditions, and with the inflatable tire parts form an easy riding structure.

Having thus fully described my invention, what I claim as new and desire to secure by Letters Patent is:

1. In a detachable tread for pneumatic tires, the combination of an annular rim, an inflatable tire about said rim, spaced-apart annular wearing shoes about the outer periphery of said inflatable tire, each of said annular wearing shoes having a closed strengthening ring of fabric and a series of spaced-apart closed wire rings embedded therein, said outer periphery of said inflatable tire and said annular flexible wearing shoes having spaced-apart tongue and groove connections between them, said connections located adjacent to the respective side-edges of said outer periphery, the inflating space of said inflatable tire located between all said tongue and groove connections and said rim, and said closed fabric rings being wider than said respective tongue and groove connections and located between said series of closed wire rings in said respective flexible wearing shoes and said tongue and groove connections.

2. In a detachable tread for pneumatic tires, the combination of a rim, an inflatable tire about said rim, an annular wearing shoe about the outer periphery of said inflatable tire, said wearing shoe having a closed strengthening ring of fabric and a series of spaced-apart closed wire rings embedded therein, said outer periphery of said inflatable tire and said annular wearing shoe having a tongue and groove connection between them, and said closed fabric ring being wider than said tongue and groove connection and located between said series of closed wire rings in said wearing shoe and said tongue and groove connection.

In testimony whereof, I have hereunto signed my name in the presence of two subscribing witnesses.

AUGUST G. MASS.

Witnesses:
GEO. C. KUHN,
ANNA B. ARSTINGSTALL.

Copies of this patent may be obtained for five cents each, by addressing the "Commissioner of Patents, Washington, D. C."